United States Patent [19]
Dougherty et al.

[11] Patent Number: 6,011,079
[45] Date of Patent: Jan. 4, 2000

[54] RELEASE COATING COMPOSITIONS COMPRISING AN ACRYLATE-FUNCTIONAL SILICONE RESIN AND A VINYLETHER

[75] Inventors: James A. Dougherty, Pequannock; John Mc Kittrick, Jersey City, both of N.J.

[73] Assignee: ISP Investments Inc., Wilmington, Del.

[21] Appl. No.: 08/948,208

[22] Filed: Oct. 9, 1997

[51] Int. Cl.⁷ .............................. C08F 2/50; C08L 83/07; B32B 27/16; C08G 77/20
[52] U.S. Cl. .................................. 522/99; 522/15; 522/31; 522/41; 522/42; 528/12; 528/23; 528/25; 528/32; 428/447
[58] Field of Search .................................. 522/99, 172, 15, 522/31, 41, 42; 428/447; 528/12, 23, 25, 32

[56] References Cited

U.S. PATENT DOCUMENTS

| | | |
|---|---|---|
| 3,577,265 | 5/1971 | Nordstrom . |
| 4,201,808 | 5/1980 | Cully et al. ................. 522/99 |
| 4,279,717 | 7/1981 | Eckberg et al. . |
| 4,293,678 | 10/1981 | Carter et al. . |
| 4,306,050 | 12/1981 | Koerner et al. . |
| 4,348,454 | 9/1982 | Eckberg . |
| 4,617,238 | 10/1986 | Crivello et al. . |
| 5,510,190 | 4/1996 | Allen et al. ................. 522/99 |
| 5,616,629 | 4/1997 | Nguyen et al. ............. 522/99 |

FOREIGN PATENT DOCUMENTS 2300421  4/1996  United Kingdom .

OTHER PUBLICATIONS

G.S. Russell, radTeach Europe '95 Conference Proceedings, p. 394–407, Sep. 1995.
R.P. Eckberg, Science and Engineering, vol. 72, pp. 419–420, Apr. 1995.
R.P. Eckberg, Radcure '84 Conf. Proc., p. 2–1 to 2–18, Soc. Manuf. Eng., Dearborn, Mich. (1984).
D.J. Cyterski, Radcure '84 Conf. Proc., p. 2–19 to 2–26, Soc. Manuf. Eng., Dearborn, Mich. (1984).
C. Priou, J. Cavezzan, A. Soldat F. Castellanos and J.P. Fouassier, RadTech '94 Conf. Proc., Orlando Fl, 1994, p. 187–193.
C. Herzig, RadTech '94 Conf. Proc., Orlando Fl., pp. 635–646, May 1994.
J.A. Dougherty and F.J. Vara, RadTech '90 North America Conference Proceedings, vol. 1, 402–409, Chicago, Il., Mar. 25 to 29, 1990.

*Primary Examiner*—Susan W. Berman
*Attorney, Agent, or Firm*—Walter Katz; William J. Davis; Marilyn J. Maue

[57] ABSTRACT

A radiation curable release coating composition comprising, by weight, (a) 10–90% of an acrylate-functional silicone resin, (b) 10–90% of a vinylether monomer as reactive diluent therein, and (c) a photoinitiator.

8 Claims, 1 Drawing Sheet

RELEASE COATING COMPOSITIONS COMPRISING AN ACRYLATE-FUNCTIONAL SILICONE RESIN AND A VINYLETHER

BACKGROUND OF THE INVENTION

1. Field of the Invention

This invention relates to release coating compositions, and, more particularly, to UV-curable liquid compositions of predetermined viscosity containing an acrylate-functional silicone resin and a miscible vinylether.

2. Description of the Prior Art

Release coatings are substances which control or eliminate the adhesion between two surfaces. Often, curing of the liquid release coating is accomplished by solvent removal and thermal crosslinking. Radiation curable release coatings, on the other hand, contain no solvent and have the unique ability to be cured at, or slightly above, room temperature. Polymerization is initiated by ultraviolet light (UV) or electron beam (EB) exposure. Most commercial radiation curable release coatings are based on polydimethylsiloxane resins which have been functionalized with reactive groups.

Many successful radiation curable release coating are based on acrylate functional silicones which are cured by a free radical mechanism. The viscosity and cure speed of these systems are best modified by incorporating reactive diluents; however, the choice of reactive diluents is severely limited by the poor compatibility of many commonly used monomers. Furthermore, free radical polymerizations are inhibited by the presence of oxygen and the high oxygen permeability of silicones amplifies this effect. Thus, commercially acceptable cure speeds are best obtained with expensive nitrogen inerting. Cationically curable epoxy and vinyloxy organo polysiloxanes also are known. These coatings cure rapidly with UW exposure, and, unlike free radical polymerizations, cationic polymerization is not inhibited by the presence of oxygen, thus eliminating the need for nitrogen inerting. Nevertheless, there are still several performance needs. First, compatible reactive diluents are still needed to adjust the viscosity and cure speed. Second, while UW-curable silicone release coatings can readily provide a low energy surface giving low or "easy" release coatings; controlling the level of release is difficult. Control release additives have been only partially successful in developing moderate or "tight" release coatings. Finally, silicones are frequently less economically attractive than other organic resins.

Vinylethers are effective reactive diluents for epoxy functional silicones in cationic release coating systems. Vinylethers are also known to be effective reactive diluents for urethane and epoxy acrylate oligomers in free radical and hybrid wood coating formulations.

SUMMARY OF THE INVENTION

In this invention, vinylethers are used as reactive diluents for acrylate functional silicones in release coating systems. What has been discovered is that vinylethers are surprisingly effective diluents in these systems and can be used to decrease the solution viscosity, control the level of release, and reduce the cost of such formulations.

Accordingly, the invention is directed to a radiation curable release coating composition comprising, by weight, (a) 10–90% of an acrylate-functional silicone resin, (b) 10–90% of a vinylether monomer as reactive diluent therein, and (c) a photoinitiator.

In the preferred embodiments of the invention, (b) is miscible with (a) and reduces the viscosity of the composition to a viscosity of about 100–2000 cps. Component (b) preferably is present in an amount of about 10–50% by weight of the composition, which is curable in air with a free radical or cationic photoinitiator, or both; (c) is present in an amount of about 3 phr; and (a) is an acrylate functional polydimethyl silicone.

DETAILED DESCRIPTION OF THE INVENTION

The vinylether monomers used herein were obtained from International Specialty Products, Inc. (see TABLE I below). Acrylate functional silicones (RC 726 and RC 708) were obtained from the Goldschmidt Chemicals Corporation. Iodonium salt cationic photoinitiators were obtained from GE Silicones (UV9380C) and Rhone-Poulenc (PC-702). The free radical photoinitiator (Darocur 1173), was obtained from Ciba Additives Division. Melinexe® 505 polyethylene terephthalate (PET) film was obtained from ICI Americas Inc. Cold rolled steel panels were obtained from the Q-Panel Company. The adhesive tapes are manufactured by the 3M Company, Tesa Corp., and Johnson & Johnson.

TABLE I

VINYLETHER MONOMERS

| | | |
|---|---|---|
| CHVE | [structure] | 1,4 cyclohexane dimethanol divinylether |
| CVE | [structure] | cyclohexyl vinylether |

TABLE I-continued

VINYLETHER MONOMERS

| | | |
|---|---|---|
| EHVE | 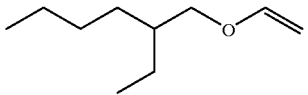 | 2-ethylhexyl vinylether |
| DDVE | 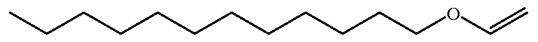 | dodedcyl vinylether |

The compatibility of vinylethers in silicone fluids was determined by blending the desired ratio of components with slight heat. The mixtures were then allowed to stand overnight and observed in the morning for any sign of phase separation.

Release coating formulations were prepared by mixing the components in an amber vial. A uniform coating of the desired coating thickness was then applied to the PET substrate using a #3 Mayer bar applicator. The liquid coating was cured by exposure to UV irradiation using an AETEK Model QC 1202A/N UV Processor containing two 200 Watt/inch medium pressure mercury vapor lamps. The UV exposure was accomplished either under air or nitrogen as indicated.

Tack-free time was defined as the maximum conveyor speed (i.e.—minimum UV dose) which can be used to produce a coating that is dry to the touch immediately after UV exposure. Rub-off was determined by rubbing the cured coating under gentle finger pressure. Any loss of adhesion or 'balling up' of the coating was considered a failure.

Quantitative measurements of release and subsequent adhesion were obtained using a Gardner Slip/Peel Tester. Coatings were cast on the PET substrate and cured by UV exposure. After 24 hours, the specified tape was applied to the surface and a 5 pound rubber roller was rolled over the tape 5 times. Release was determined by measuring the force, in grams per linear inch, required to remove the tape at an angle of 180 degrees at a speed of 1 fpm. After the tape was removed from the release coating, the subsequent adhesion was determined by reapplying the tape to a clean steel panel, rolling 5 times with the rubber roller, and again measuring the force required to remove the tape at an angle of 180 degrees. A minimum of 5 trials were conducted on each sample and the mean reported.

Aged release was determined by placing the cured sample in an oven at 70° C. for 20 hours prior to applying the test tape and measuring the release as described above.

EXAMPLE 1

Compatibility with the silicone oligomer system is a key requirement of any reactive diluent. We were surprised to find that each of the vinylethers shown in Table I was completely miscible with the acrylate functional silicone and effectively reduced formulation viscosity.

EXAMPLES 2 TO 4

Figure 1:
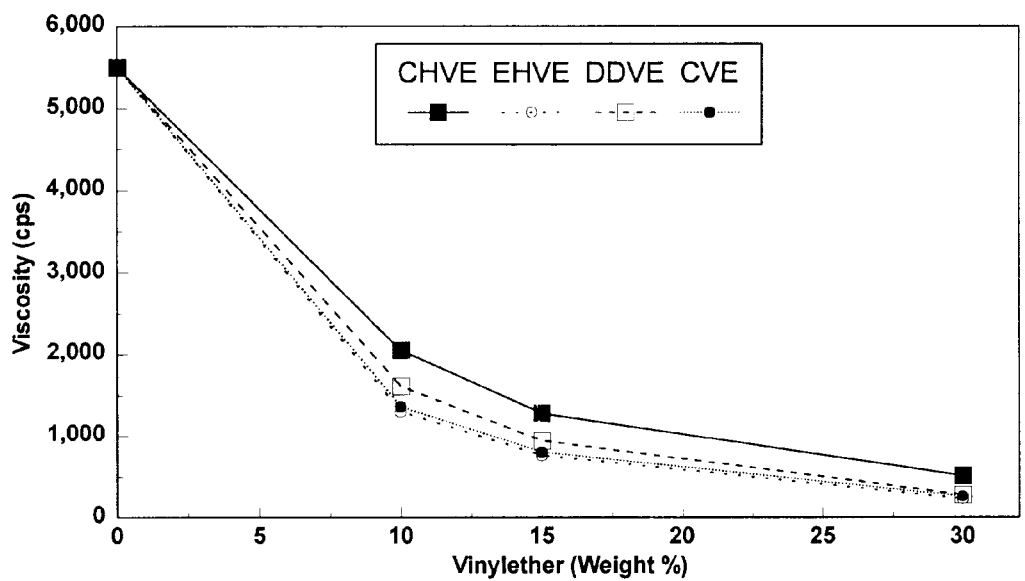
FIG. 1 shows the decrease in viscosity obtained using vinylethers as reactive diluents for RC 708.

The performance of an acrylate functional silicone (RC-726) containing 3 phr (parts per hundred resin) of the free radical photoinitiator Darocure 1173, (Example 2), was compared to the same formulation modified by adding 15 wt % CHVE, (Example 3). Example 3 was repeated except that 0.3 phr (3 phr based on CHVE) of a cationic photoinitiator (UV9380C) was incorporated (Example 4). Each formulation was applied to polyester and cured under nitrogen using the AETEC 1202 UV processor. In each case, the maximum cure speed was 50 fpm. Release properties were measured versus Johnson & Johnson Zonas surgical tape on coatings cured at 40 fpm. Results demonstrate that at 15 weight %, CHVE can be used to obtain a slight increase in the release value. In this experiment, the cationic photoinitiator is not required as no significant decrease in the subsequent adhesion or aged release is observed in formulations containing only a free radical photoinitiator (Table II).

TABLE II

RC 726 / CHVE : 85 / 15 BLEND
VERSUS J&J ZONAS TAPE

| | Release (gm/inch) | Subsequent Adhesion (gm/inch) | Aged Release (gm/inch) |
|---|---|---|---|
| EXAMPLE 2 RC 726 Control (No CHVE) | 2.2 | 191.8 | 2.72 |
| EXAMPLE 3 15 Wt % CHVE added to example 2 | 3.5 | 185.4 | 2.9 |
| Example 4 0.3 phr cationic photoinitiator added to example 3 | 3.44 | 190.6 | 2.32 |

EXAMPLE 5 AND 6

Examples 3 and 4 were repeated except that release properties were measured versus TESA 7475 tape which is a much more aggressive adhesive than the J&J Zonas tape. Superior results shown in example 6 for both release and subsequent adhesion indicate that a cationic photoinitiator can be used to enhance performance in demanding applications (Table III).

TABLE III

RC 726 / CHVE : 85 / 15 BLEND
VERSUS TESA 7475 TAPE

| | Release (gm/inch) | Subsequent Adhesion (gm/inch) | Aged Release (gm/inch) |
|---|---|---|---|
| EXAMPLE 5 RC-726 with 15 Wt % CHVE added | 5.05 | 1051.5 | 4.27 |

TABLE III-continued

RC 726 / CHVE : 85 / 15 BLEND
VERSUS TESA 7475 TAPE

| | Release (gm/inch) | Subsequent Adhesion (gm/inch) | Aged Release (gm/inch) |
|---|---|---|---|
| Example 6 0.3 phr cationic photoinitiator added to example 5 | 4.32 | 1647.2 | 3.55 |

EXAMPLE 7 AND 8

As the level of vinylether in the formulation is increased, a cationic photoinitiator is strongly recommended. At 50 wt % CHVE, 1.5 parts free radical photoinitiator and 1.5 parts cationic photoinitiator (Example 7) gave excellent results while the formulation containing 3.0 parts of the free radical initiator and no cationic initiator (Example 8) was wet to the touch after UV exposure (Table IV). Since UV 9380C (a commercially available cationic photoinitiator) already contains ITX (a free radical photoinitiator) as a photosenitzer, the additional free radical photoinitiator may not be required. Furthermore, comparison of example 2 and example 7 demonstrates that CHVE is an effective control release additive for acrylate functional silicones. Incorporating 50% CHVE increases the level of release by a factor of three while improving the subsequent adhesion.

TABLE IV

RC 726 / CHVE : 50 / 50 BLEND
VERSUS J&J ZONAS TAPE

| | Release (gm/inch) | Subsequent Adhesion (gm/inch) | Aged Release (gm/inch) |
|---|---|---|---|
| EXAMPLE 2 RC 726 Control (No CHVE) | 2.2 | 191.8 | 2.72 |
| EXAMPLE 7 50 Wt % CHVE with Free Radical + Cationic photoinitiators | 6.62 | 230.8 | 7.32 |
| EXAMPLE 8 50 Wt % CHVE with only a Free Radical photoinitiator | wet | wet | wet |

COMPARATIVE EXAMPLES 9 AND 10

Free radical polymerizations are known to be inhibited by the presence of oxygen. This effect is amplified in acrylate functional silicones due to the high oxygen permeability of silicones. Thus, commercially acceptable cure speeds are best obtained with expensive nitrogen inerting. This is illustrated quite dramatically in Table V. The acrylate functional silicone containing 3 phr free radical photoinitiator fails to produce a dry surface when cured under air (Example 9). A dry, tack-free surface can only be obtained by curing under an inert atmosphere (Example 10).

TABLE V

EFFECT OF CURING ATMOSPHERE
ON THE CONTROL FORMULATION

| | Release (gm/inch) | Subsequent Adhesion (gm/inch) | Aged Release (gm/inch) |
|---|---|---|---|
| EXAMPLE 9 RC 726 Cured under air | wet | wet | wet |
| EXAMPLE 10 RC 726 Cured under nitrogen | 2.2 | 191.8 | 2.72 |

EXAMPLES 11 AND 12

In contrast, when high levels of vinylethers are used in conjunction with acrylate functional silicones in a hybrid (free radical and cationic) formulation, UV cure can be readily accomplished in air. As shown in Examples 11 & 12, a formulation containing 80 weight % DDVE, 10 weight % CHVE and 10 weight % silicone acrylate with 1.2 parts of Darocure 1173 and 1.2 parts UV9380C was readily cured at 40 fpm (1000 mJ/cm$^2$) in either air or nitrogen. This is a significant finding considering the high cost of maintaining a nitrogen atmosphere.

TABLE VI

EFFECT OF CURING ATMOSPHERE
ON A VINYLETHER / SILICONE ACRYLATE FORMULATION

| | Release (gm/inch) | Subsequent Adhesion (gm/inch) | Aged Release (gm/inch) |
|---|---|---|---|
| Example 11 Cured in air | 2.8 | 211.6 | 3.1 |
| Example 12 Cured in nitrogen | 3.1 | 196.8 | 3.2 |

In summary, vinylethers are effective reactive diluents for acrylate functional silicone resins. CHVE is an effective control release additive while the monovinylethers CVE, EHVE, and DDVE can be used alone, or in conjunction with CHVE, to modify initial release and improve subsequent adhesion and aged release.

At low levels of vinylethers, a cationic photoinitiator is not needed. At higher vinylether levels, a hybrid formulations containing both a free radical and cationic photoinitiator is recommended. In addition to the benefits described above, hybrid formulations containing low levels of acrylate functional silicones can be readily cured in air thus avoiding the high expense associated with nitrogen inerting.

While the invention has been described with particular reference to certain embodiments thereof, it will be understood that changes and modifications may be made which are within the skill of the art. Accordingly, it is intended to be bound only by the following claims, in which:

What is claimed is:

1. A radiation curable release coating composition consisting essentially of, by weight,
   (a) 10–90% of an acrylate-functional polydimethyl silicone resin,
   (b) 10–90% of a vinylether monomer as reactive diluent, and
   (c) a photoinitiator, which components are completely miscible, said composition having a viscosity of 100–2000 cps.

2. A composition according to claim 1 wherein said vinylether is selected from the group consisting of 1,4-cyclohexane dimethanol divinylether, cyclohexyl vinylether, 2-ethylhexyl vinylether and dodecyl vinylether, or mixtures thereof.

3. A composition according to claim 1 wherein (b) is present in an amount of about 10–50%.

4. A composition according to claim 1 wherein said photoinitiator is free radical or cationic photoinitiator or both.

5. A composition according to claim 1 wherein (c) is present in an amount of about 3 phr.

6. A process for forming a release coating on a substrate, which comprises applying the composition of claim 1 to said substrate and curing the thus-coated substrate in air.

7. A process according to claim 6 wherein curing is carried out at a ultraviolet exposure of at least 1000 mJ/cm$^2$.

8. A product of the process of claim 6.

* * * * *